Figure 1:
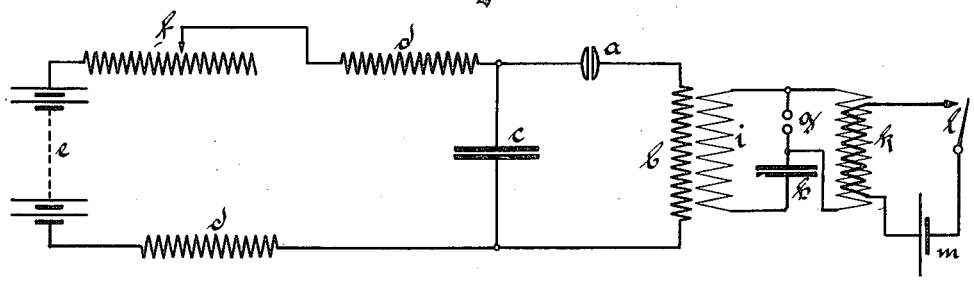

G. VON ARCO & A. MEISSNER.
MEANS FOR PRODUCING ELECTRICAL OSCILLATIONS WITH THE AID OF AN AUXILIARY
OSCILLATION CIRCUIT.
APPLICATION FILED SEPT. 17, 1912.

1,214,620.

Patented Feb. 6, 1917.
4 SHEETS—SHEET 1.

Witnesses:
H. Alfred Faulke
A. B. Knight

Inventors:
Georg von Arco
and
Alexander Meissner
by their attorneys.

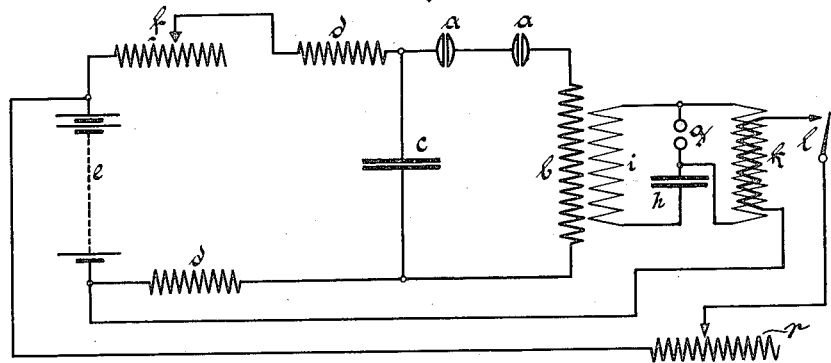
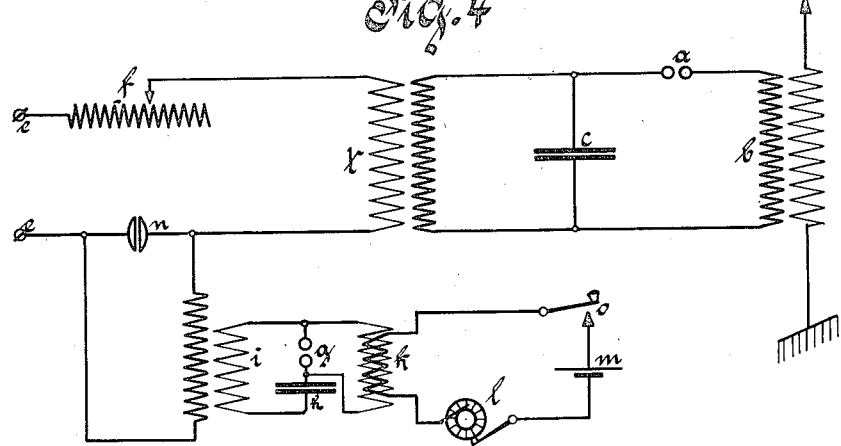
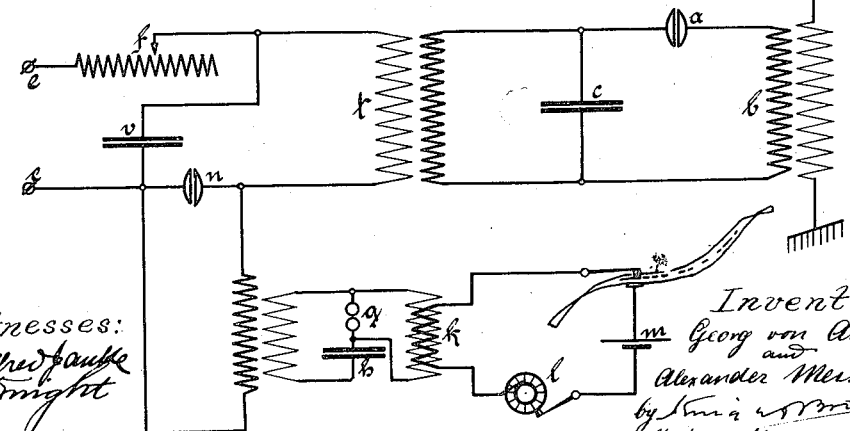

G. VON ARCO & A. MEISSNER.
MEANS FOR PRODUCING ELECTRICAL OSCILLATIONS WITH THE AID OF AN AUXILIARY OSCILLATION CIRCUIT.
APPLICATION FILED SEPT. 17, 1912.

UNITED STATES PATENT OFFICE.

GEORG von ARCO AND ALEXANDER MEISSNER, OF BERLIN, GERMANY, ASSIGNORS TO GESELLSCHAFT FUR DRAHTLOSE TELEGRAPHIE, M. B. H., OF BERLIN, GERMANY.

MEANS FOR PRODUCING ELECTRICAL OSCILLATIONS WITH THE AID OF AN AUXILIARY OSCILLATION-CIRCUIT.

1,214,620.   Specification of Letters Patent.   Patented Feb. 6, 1917.

Application filed September 17, 1912. Serial No. 720,897.

*To all whom it may concern:*

Be it known that we, GEORG VON ARCO and ALEXANDER MEISSNER, subjects of the German Emperor and of the Austro-Hungarian Emperor, respectively, and residing at Berlin, Germany, have invented certain new and useful Improvements in Means for Producing Electrical Oscillations with the Aid of an Auxiliary Oscillation-Circuit, of which the following is a full and clear specification.

The invention is illustrated in the accompanying drawings and its particular novel features are set forth in the annexed claims.

Our invention relates to means for producing electrical oscillations or also alternating currents of medium frequency, in which an auxiliary ignition or bridging of the spark gap of the main oscillation circuit is used to permit the use of low primary tensions such as are used for instance in ordinary light circuits, and to also produce clear tones in case of transmitters in which quench gaps are employed.

Frequent attempts have been made to effect, what we shall call hereafter the ignition of the main spark gap, through a higher auxiliary voltage and the arrangement in this case is such that the auxiliary electromotive force charges the condenser of the working circuit (main oscillatory circuit) or that in the ignition circuit a condenser is used, the capacity of which is larger than that of the working circuit. To simplify the description we shall hereafter call the main or primary oscillation circuit of the system, the "working circuit", and the circuit by which the ignition of the main gap is produced the "ignition circuit". The arrangements known in the art and above referred to, may be used with success in exciting circuits which use the arc method, because the ignition is in this case only necessary to introduce the oscillations, and because the spark gap which is made conducting by the introduced oscillations, requires further or renewed ignition only after the arc is entirely extinguished. In case of primary oscillation circuits on the other hand, in which for each discharge of the spark gap a new ignition is neccessary, the ignition method above referred to cannot be practically used if the working tension of the primary circuit is not in accordance with the length of the spark gap; in particular the method above referred to cannot be used for shock excitation, because in this case with the old method above described the ignition energy must be at least equal to if not larger than the energy to be transmitted. In order to overcome this disadvantage it has been suggested to use the ignition energy, not for the bridging or breaking down of the spark gap of the working circuit, but to increase the conductivity of the main spark gap by exposing one of its electrodes to ultra-violet rays, and thus to make use of a physical phenomenon which was observed the first time by Hertz. This method, however, has not been found practical because the ionizing of the spark gap is not sufficient, and the effect of this ignition method is somewhat sluggish.

According to the present invention the ignition of the working gap which is located in a condenser circuit or primary oscillation circuit, is effected by the high frequency discharge of an auxiliary circuit, the capacity of which is smaller than that of the working circuit and the high frequency energy of which auxiliary circuit is used for bridging or igniting the working gap or a plurality of working gaps. By this arrangement it is made possible to use such small ignition energy that it amounts to only a fraction of the working energy which is to be radiated because the large capacity of the working circuit does not come into consideration at the moment of the ignition and the entire ignition energy is concentrated and brought into effect during a very short time at the breaking down of the main working gap.

In the accompanying drawing we have diagrammatically illustrated a number of modifications by which the above described results may be obtained.

Figure 2:
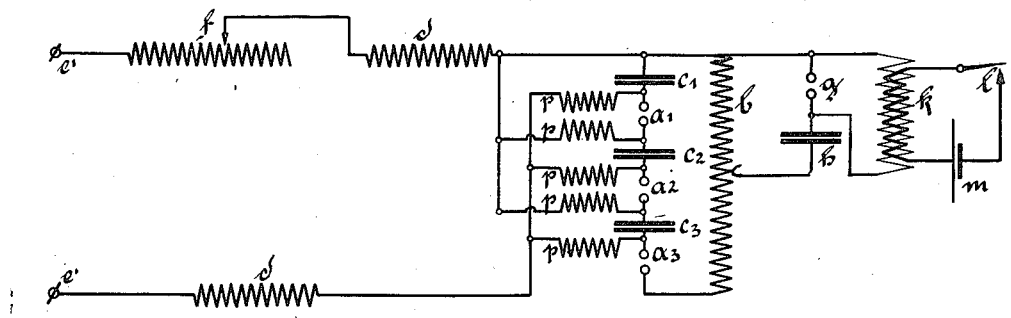
Figure 5:
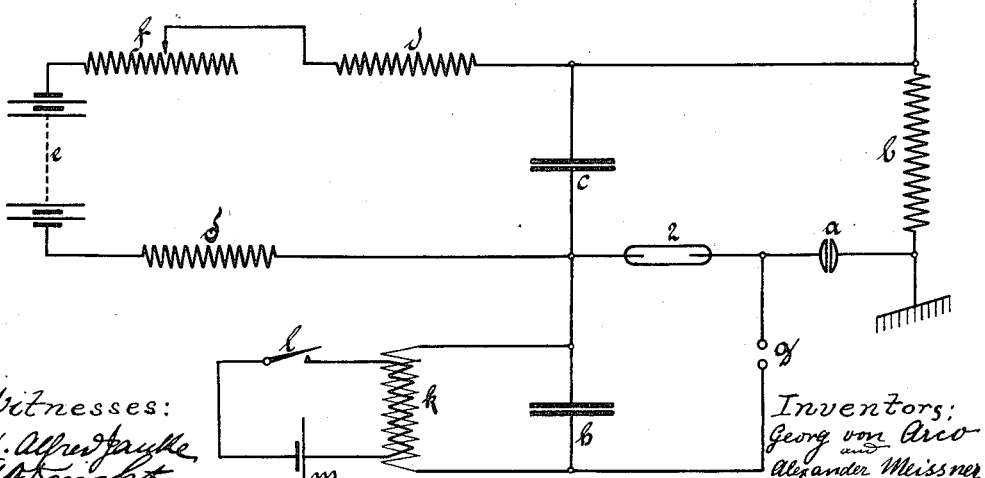
Figure 3:
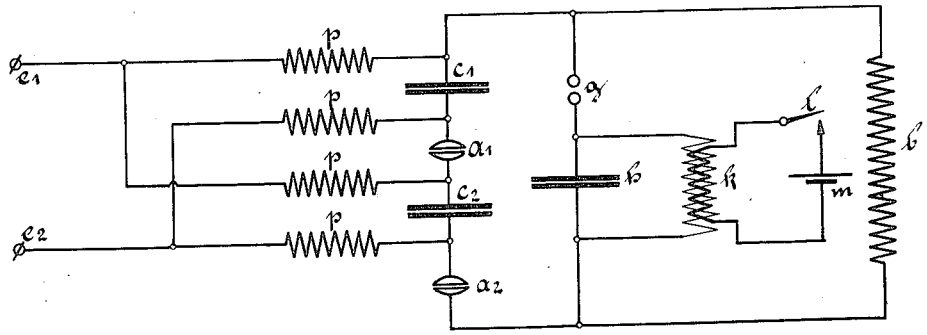
Figure 6:
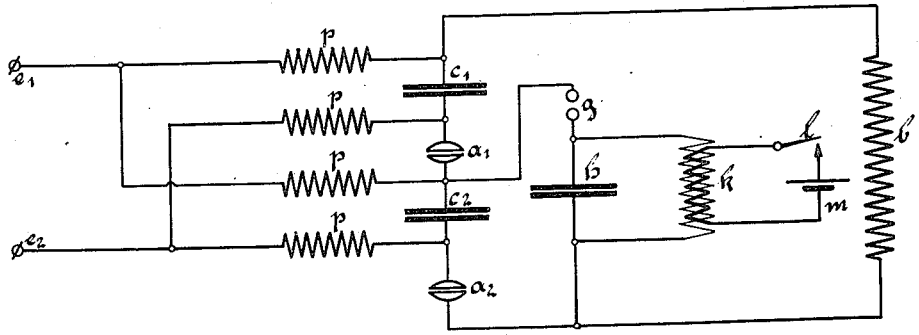
Figure 7:
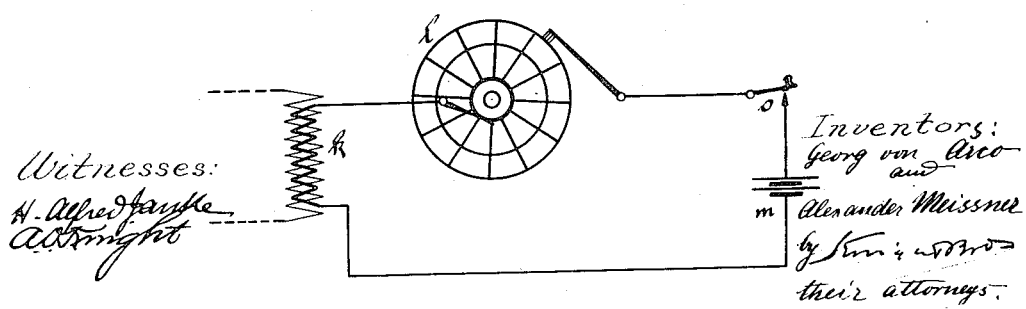
Figure 10:
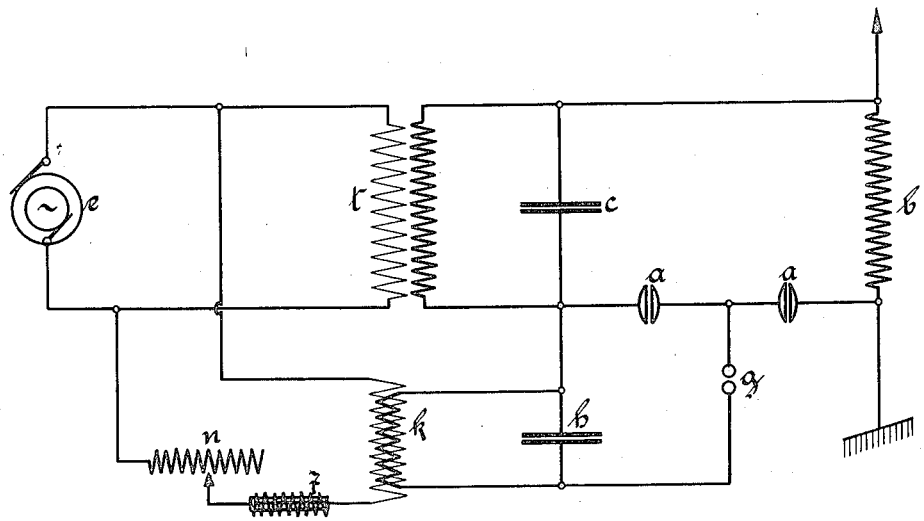
Figure 11:
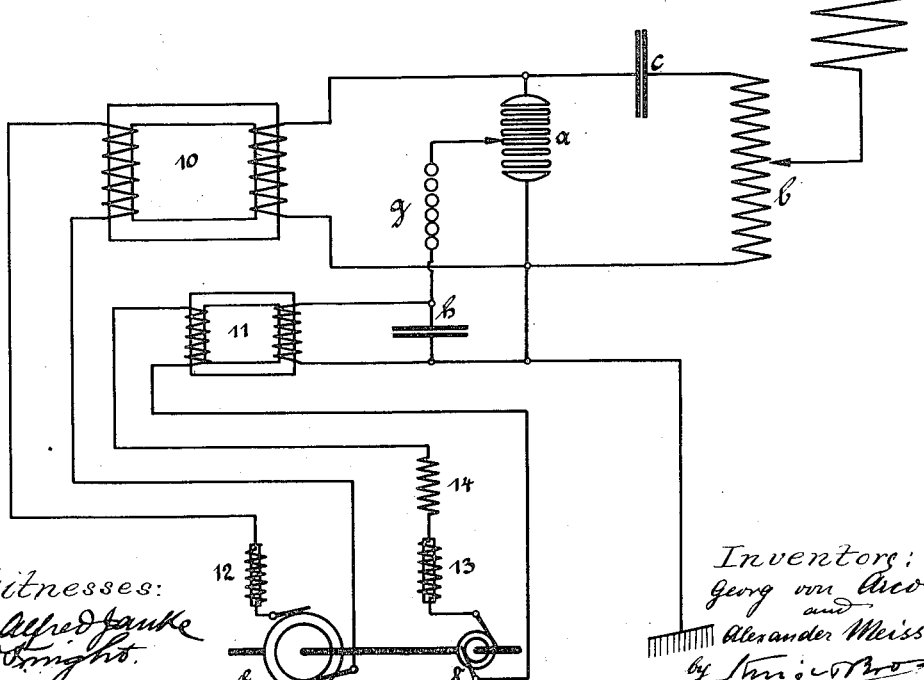

In these drawings Figure 1 shows diagrammatically a single gap disposed in an oscillating circuit for transmitting smaller energy and means for igniting this gap; Fig. 2 shows a similar arrangement for igniting a series of gaps; Figs. 3 and 6 show an arrangement in which the ignition circuit is automatically maintained in tune with the working oscillation circuit. Fig. 4 shows diagrammatically means for transmitting the working energy to the main working oscillation circuit in the form of impulses according to pitches of musical tones. Fig. 5 shows a special quench resistance separated from the spark gap and bridged by the auxiliary ignition circuit. Fig. 7 shows a part of the ignition circuit in which the interrupter is drawn as a rotary interrupter. Fig. 8 is an arrangement corresponding to Fig. 1, in which the interrupter and inductor are fed from the main source. Fig. 9 shows an arrangement, in which a condenser is rhythmically discharged. Fig. 10 shows an arrangement with phase-shifting. Fig. 11 shows an arrangement with two generators mechanically coupled on the same shaft.

Referring to Fig. 1, $a$ represents the main discharge gap of a primary oscillation circuit or working circuit containing the inductance $b$ and the capacity $c$. $d$ represents choking coils and $e$ represents the source of current, in this case, a battery, which is connected to the circuit through an adjustable resistance $f$. $g$ represents the auxiliary gap by which the ignition circuit containing the small capacity $h$ and the inductance $i$ is brought into action. $k$ is an inductor with its secondary coil connected to spark gap $g$ and capacity $h$ in the usual manner, its primary coil being in circuit with an interrupter $l$ and a battery $m$. The ignition circuit of the main gap $a$ is as follows: It is assumed that the gap $a$ is not in operation. In this case gap $a$ constitutes a small capacity, the value of which depends upon the form of the gap electrodes, which are in series with the large capacity $c$ and, owing to the resulting small capacity of the entire circuit in which gap $a$ and capacity $c$ are located, the main oscillation circuit in which the inductance $b$ is also located forms at that time an oscillation circuit with a frequency considerably above the one generally used in wireless telegraphy in the primary oscillation circuit. The value of this frequency is substantially determined by the value of the inductance $b$ which thus may be also considered as a radiating coil excited by the ignition circuit and loaded by the small capacity of the open working circuit. In order to permit the use of a very small ignition energy it is of advantage to choose the value of the inductance $i$ and the capacity $h$ so that the ignition circuit is in tune with the open working circuit. Then each interruption of the ignition circuit at the interrupter $l$ will effect the ignition of the main gap $a$ and thus the closing of the main working circuit. This effect ceases as soon as the energy in one series of discharges is consumed. Thus the gap $a$ is bridged by the high frequency discharges of the ignition circuit and the condenser $c$ previously charged by the electromotive force of battery $e$, over the choking coils $d$, enabled to discharge over the now conducting spark gap $a$ and the inductance $b$. The condenser $c$ now is discharged as usual, whereby gap $a$ loses its conductivity when the oscillations cease and the oscillations can only be started again by a renewed ignition. This ignition above described may be employed as well in the older forms of primary oscillation circuits as also in the more recent shock excitation method. The use of quench sparks as in the latter method has the advantage that a better quench effect is obtained in any of the novel arrangements forming the subject matter of the present application. In order to start oscillations in the primary oscillation circuit $a$, $b$, $c$ in Fig. 1, without the ignition circuit, the electromotive force of battery $e$ must be greater than the break down tension of the quench gap $a$. On the other hand, when the ignition arrangement as described above, is used not only the electromotive force of battery $e$ may be smaller, but also any desired number of main gaps may be arranged in series and be bridged by the auxiliary ignition which will all contribute to the quench effect. The arrangement may be made so in this case that either all gaps are ignited at the same time as shown in Fig. 1 or a special quench resistance 2 separated from spark gap $a$ may be bridged by the auxiliary ignition and the oscillations be started thereby, as shown in Fig. 5. In this case it is possible to quench the gap after the first half of the oscillation period and to use considerably closer coupling.

If it is desired to transmit larger energy at small tension of the supply current, the arrangement may be connected with the so-called Braun's energy connection, in which energy circuits are arranged in series in any desired number. This arrangement is shown in Fig. 2. The spark gaps $a^1$, $a^2$, $a^3$ in this figure are simultaneously ignited by means of the ignition arrangement and therefore no phase-shifting can occur between the discharge of the condensers $c^1$, $c^2$ and $c^3$. It is therefore permissible to combine the inductance of all circuits into one inductance $b$. $p$ $p$ represent in this arrangement choking coils. $e^1$, $e^1$ represent the source of current for the working circuit.

Fig. 3 represents an arrangement which has the advantage over those shown in Figs. 1 and 2 that it is not necessary to carefully tune the ignition circuit to the coil $b$. This special tuning is not necessary because coil $b$ represents the inductance as well of the working circuit as also of the ignition circuit. Therefore if the wave length of the working circuit is varied the inductance of the ignition circuit is naturally varied with it. In the arrangement shown in Fig. 3 $g$ represents the auxiliary gap which, with the condenser $h$ and the inductance $b$ in series, represents the ignition circuit rigidly coupled with the working circuit. $e^1$, $e^2$ represent the current source for the working circuit. In Fig. 3 one electrode of gap $g$ is directly connected with inductance $b$. In Fig. 6 which is otherwise similar to Fig. 3, one electrode of the gap $g$ is connected with one electrode of main gap $a^1$ and capacity $c^2$.

The ignition in the arrangements according to Figs. 3 and 6 then takes place as follows: First by the auxiliary ignition circuit the condenser $h$ is charged until gap $g$ breaks down. Thereby high frequency oscillations are set up in the circuit formed by $h$, $g$ and coil $b$, which produce potentials at the ends of coil $b$, which are higher than the charging potential of condenser $h$ at which the gap $g$ broke down. This higher potential at the ends of coil $b$ also exists at $c^1$, $a^2$ or $c^1$, $c^2$, and thereby also the working gaps $a^1$, $a^2$ are broken down. Thus a number of working gaps may be broken down in this manner.

It is advisable to choose the number of impulses of the ignition discharges so that they correspond with the pitch of an audible tone. If this is observed also the discharge in the working circuit will take place at the same pitch. This pitch in the working circuit remains constant even if the charging tension of the working circuit is varied which may be desirable in case the amount of energy to be transmitted is regulated by varying the resistances. A continuous or step by step variation of the pitch in the working circuit may be easily obtained by means of interrupter $l$. This interrupter may be easily constructed so that only a certain musical tone and a slight variation thereof can be produced. This arrangement is shown in Fig. 7, in which the interrupter $l$ is drawn as rotary-interrupter with variable speed and which shows only a part of the ignition circuit. Economy does not come into consideration in the ignition circuit on account of the small energies which are transmitted by this circuit. Of course the ignition arrangement need not necessarily be operated by an independent source of current for instance as shown at $m$ in the drawings but it may be also suitably connected with the source of electromotive force $e$ for the working circuit, as shown in Fig. 8. This figure corresponds to Fig. 1, except that interrupter $l$ and inductor $k$ are fed from the main source $e$ instead of from a special source. $r$ represents a variable resistance.

In Fig. 4 is illustrated how by means of the ignition arrangement the working current may be supplied to the working circuit in the form of impulses equal to the pitch of a musical tone. For this purpose an ignition arrangement such as shown in Figs. 1 to 3 may be used for igniting a gap $n$ located in the supply line of the working current. If by this ignition circuit gap $n$ is ignited rhythmically in the pitch of a certain tone, the energy is supplied rhythmically to the transformer $t$, either by rhythmically interrupting the working current by the ignition (Fig. 4) or by rhythmically discharging a condenser $v$ (Fig. 9). In this figure, $e$, $e$, represent the source of current for the working circuit. Also in this case it is of advantage to use a quench spark gap, the gap space of which is chosen so that the normal tension of the source of current $e$ is insufficient to break down gap $n$ and to maintain the arc when the main discharge takes place. The arrangement is such that only when the ignition arrangement connected with gap $n$ operates, can a current impulse of short duration and consequently a short spark at the spark gap $a$ take place.

The use of this new ignition arrangement has the further advantage in transmitting apparatus, that as may be seen from Fig. 4, the interrupter $o$ is removed from the working circuit and located in the auxiliary ignition circuit. Thus all difficulties inherent to the opening and closing of circuits carrying strong currents which have given rise to the construction of special interrupters in large stations, are overcome. In the present case where only small currents are to be interrupted in the ignition circuit, not only an ordinary Morse key may be used but also any devices such as perforated strips 4 as are used in rapid telegraphy, may be used, see Fig. 9.

The present arrangement may also be used to obtain clear tones in stations which are operated in the ordinary way with alternating current and where singing sparks are employed and whereby the coupling is unfavorable. Any unfavorable results arising therefrom may be improved by maintaining the ignition synchronous with the alternating current tension but employing suitable phase-shifting so that the spark in the working circuit always occurs at the same moment, see Fig. 10. This auxiliary ignition when used in transmitters which employ insufficiently quenched gaps, will even then produce clear tones. In Fig. 10, $e$ is the alternating current source and 7 a choking coil, causing the phase-shifting.

A further advantage of the present auxiliary ignition is that singing sparks may be produced even when alternating current of low periodicity is used in the exciting circuit. It is only necessary in this case that the main or working gap $a$ be adjusted so that it is larger than the normal working tension is capable of breaking down. Of course also in this case the interruptions in the ignition circuit should be of such frequency that they will correspond with a musical tone. The condenser $c$ then discharges in the rhythm of the ignitions and groups of perfectly clear musical tones are produced.

By means of a simple arrangement the energy may be simultaneously enlarged many times. It is only necessary that in this case the supply circuit contain inductances as shown in Fig. 3 at $p$ and that ohmic resistances are avoided. In order to show in a simpler arrangement how this effect may be obtained it is assumed that in Fig. 1 the ohmic resistance $f$ in the conductors, leading from the direct current source, is omitted, and that only the inductances $d$ are provided. Then at the moment gap $a$ breaks down, a short circuit current flows from source $e$ over $d$, $a$ and $b$, and also at the moment the spark is quenched at $a$ a considerable variation in the intensity of such current takes place on account of the opening of the short circuit. Each of such variations as is known causes in an inductance a sudden increase of the potential by the generation or disappearance of the magnetic field. If now the values of the elements comprising the oscillation circuit are properly chosen, in particular if the value of the inductance $b$ is properly selected, it may be brought about that the above mentioned potential rises to a considerably higher value than the potential of source $e$, by which the condenser $c^1$ is charged. At such higher potential this condenser receives of course for a moment a higher charge and if at such moment the auxiliary ignition happens to break down the gap $a$, the greater energy of condenser $c^1$ will be discharged into and swing in the main oscillation circuit. By properly controlling the time intervals between the occurrence of the auxiliary ignition in the circuit $d$, $i$, $h$, it is brought about that such ignition takes place at each of the above moments, where the condenser $c^1$ has received an extra charge. The energy which then oscillates is greater than that which would oscillate without the above mentioned arrangement.

It has been previously stated that alternating current may be used for supplying the necessary energy to the working circuit and that when simultaneously alternating current is supplied to the auxiliary or ignition circuit in proper synchronism with the alternating current of the main circuit, particularly good results may be obtained with singing quench sparks. It is of course obvious that the energy with which the main working circuit is charged may be easily controlled by varying the tension of the alternating current generator connected with the main circuit. If now the energy supplied to the auxiliary circuit is taken from the same generator, it has the disadvantage that the ignition energy remains constant only within certain limits of the energy variation of the main circuit. To avoid this disadvantage the arrangement may be made so that a special generator is used for supplying energy to the transformer of the ignition circuit, the tension of which generator is synchronous with the tension of the main generator. The simplest way of obtaining this result is to mechanically couple the two generators on the same shaft. See Fig. 11. Thus the tension and hereby the energy output of the main generator may be varied at will without thereby in any way affecting the energy output of the ignition circuit. This arrangement also has the great advantage that the pitch of the tone of the transmitter may be easily varied by suitably controlling the distributions of the ignitions over the periods of the ignition circuit by means of a resonance transformer located in the ignition arrangement.

A resonance transformer is from its general appearance not different from ordinary transformers and it has therefore been diagrammatically represented in Fig. 11 the same as an ordinary transformer. The action of a resonance transformer for increasing the tone is as follows: The circuit comprising the generator 8, choking coil 13, resistance 14 and the primary coil of transformer 11 has the same frequency (generator frequency) as the circuit in which the secondary coil of transformer 11 and condenser $h$ are located. The result of this is, that the amplitude of the potential at the condenser terminals increases with each succeeding period of the generator potential until it reaches a value at which the gap $g$ of the ignition circuit breaks down. By properly varying resistance 14 this break down potential may be reached earlier or later, that is to say, after a smaller or larger number of periods of generator 8. If the resistance is regulated for instance so that the amplitude of the potential in the secondary circuit of the transformer is equal to the break down potential at each period of the generator, the resulting tone corresponds with the periodicity of generator 8. By increasing resistance 14 the break down potential may be reached after every second or third period. The tone then has a pitch equal to one-half or one-third of the generator periodicity.

In Fig. 11 $e$ is the feeding source, i. e. a main alternating current generator and 8 a synchronous generator on the same shaft. 10 is a main transformer, and 11 the igniting transformer, 12 is the main ignition choking coil, 13 the choking coil, 14 a special resistance, 15 the antenna and 16 a prolongation or loading coil.

What we claim is:

1. Means for producing damped electric oscillations of high or medium frequency comprising a main primary oscillation circuit containing a spark gap, a capacity and an inductance, means for supplying a working current to said circuit and an auxiliary high frequency oscillation circuit having a capacity smaller than that of the main oscillation circuit, and means for supplying electric energy to said auxiliary circuit, said two oscillation circuits being suitably connected to cause the high frequency energy produced in the auxiliary circuit to break the gap in said main oscillation circuit.

2. Means for producing damped electric oscillations of high or medium frequency, comprising a main primary oscillation circuit containing a spark gap, a capacity and an inductance, means for supplying a working current to said circuit and an auxiliary high frequency oscillation circuit having a capacity smaller than that of the main oscillation circuit, and means for supplying electric energy to said auxiliary circuit, said two oscillation circuits being coupled by a transformer to cause the high frequency energy produced in the auxiliary circuit to break the gap of said main oscillation circuit.

3. Means for producing damped electric oscillations of high or medium frequency, comprising a main primary oscillation circuit containing a plurality of spark gaps, a capacity and an inductance, means for supplying a working current to said circuit and an auxiliary high frequency oscillation circuit having a capacity smaller than that of the main oscillation circuit, and means for supplying electric energy to said auxiliary circuit, said two oscillation circuits being suitably connected to cause the high frequency energy produced in the auxiliary circuit to break all of said gaps in said main oscillation circuit.

4. Means for producing damped electric oscillations of high or medium frequency, comprising a main primary oscillation circuit containing a plurality of spark gaps, a capacity and an inductance, means for supplying a working current to said circuit and an auxiliary high frequency oscillation circuit having a capacity smaller than that of the main oscillation circuit and means for supplying electric energy to said auxiliary circuit, said two oscillation circuits being suitably connected to cause the high frequency energy produced in the auxiliary circuit to break at least some of said plurality of gaps in said oscillation circuit.

5. Means for producing damped electric oscillations of high or medium frequency, comprising a main primary oscillation circuit containing a spark gap, a capacity and an inductance, means for supplying a working current to said circuit and an auxiliary high frequency oscillation circuit having a capacity smaller than that of the main oscillation circuit and means for supplying electric energy to said auxiliary circuit, the inductance of the main oscillation circuit forming simultaneously the inductance of the auxiliary circuit to cause the high frequency energy produced in the auxiliary circuit to break the gap of said main oscillation circuit.

6. Means for producing damped electric oscillations of high or medium frequency, comprising a main primary oscillation circuit containing a spark gap, a capacity and an inductance means for supplying a working current to said circuit and an auxiliary high frequency oscillation circuit having a capacity smaller than that of the main oscillation circuit and means for supplying electric energy to said auxiliary circuit to produce high frequency oscillations therein corresponding to the pitch of a musical tone, said two oscillation circuits being suitably connected to cause the high frequency energy produced in the auxiliary circuit to break the gap of said main oscillation circuit.

7. Means for producing damped electric oscillations of high or medium frequency, comprising a main primary oscillation circuit containing a spark gap, a capacity and an inductance, means for supplying a low frequency alternating current to said circuit to produce oscillations therein equal to the pitch of a musical tone and an auxiliary high frequency circuit having a capacity smaller than that of the main oscillation circuit and means for supplying electric energy to said auxiliary circuit, said two oscillation circuits being suitably connected to cause the high frequency energy produced in the auxiliary circuit to break the gap of said main oscillation circuit.

8. Means for producing damped electric oscillations of high or medium frequency, comprising a main primary oscillation circuit containing a spark gap, a capacity and an inductance, means for supplying a working current to said circuit and an auxiliary high frequency oscillation circuit having a capacity smaller than that of the main oscillation circuit and means for supplying electric energy to said auxiliary circuit, said two oscillation circuits being suitably connected to cause the high frequency energy produced in the auxiliary circuit to break the gap of said main oscillation circuit, and hand operated means for controlling the energy supplied to said auxiliary circuit.

9. Means for producing damped electric oscillations of high or medium frequency, comprising a main primary oscillation circuit containing a spark gap, a capacity, and an inductance, a main alternating current generator for supplying current to said circuit and an auxiliary high frequency oscillation circuit having a capacity smaller than that of the main oscillation circuit, an auxiliary alternating current generator synchronously connected with said main generator for supplying electric energy to said auxiliary circuit, said two oscillation circuits being suitably connected to cause the high frequency energy produced in the auxiliary circuit to break the gap of said main oscillation circuit.

10. Means for producing damped electrical oscillations of high or medium frequency according to the quenched spark method, comprising a highly damped main primary oscillation circuit containing a quench spark gap, a capacity and an inductance, means for supplying a working current to said circuit and an auxiliary high frequency oscillation circuit having a capacity smaller than that of the main oscillation circuit, and means for supplying electric energy to said auxiliary circuit, said two oscillation circuits being suitably connected to cause the high frequency energy produced in the auxiliary circuit to break the gap in said main oscillation circuit, said main oscillation circuit being coupled with a slightly damped secondary circuit.

11. Means for producing damped electrical oscillations of high or medium frequency according to the quenched spark method, comprising a highly damped main primary oscillation circuit containing a quench spark gap, a capacity and an inductance, means for supplying a working current to said circuit and an auxiliary high frequency oscillation circuit having a capacity smaller than that of the main oscillation circuit, and means for supplying electric energy to said auxiliary circuit, said two oscillation circuits being coupled by a transformer to cause the high frequency energy produced in the auxiliary circuit to break the gap of said main oscillation circuit, said main oscillation circuit being coupled with a slightly damped secondary circuit.

12. Means for producing damped electrical oscillations of high or medium frequency according to the quenched spark method, comprising a highly damped main primary oscillation circuit, containing a plurality of quenched spark gaps, a capacity and an inductance, means for supplying a working current to said circuit and an auxiliary high frequency oscillation circuit having a capacity smaller than that of the main oscillation circuit, and means for supplying electric energy to said auxiliary circuit, said two oscillation circuits being suitably connected to cause the high frequency energy produced in the auxiliary circuit to break all of said gaps in said main oscillation circuit, said main oscillation circuit being coupled with a slightly damped secondary circuit.

13. Means for producing damped electrical oscillations of high or medium frequency according to the quenched spark method, comprising a highly damped main primary oscillation circuit, containing a plurality of quenched spark gaps, a capacity and an inductance, means for supplying a working current to said circuit and an auxiliary high frequency oscillation circuit having a capacity smaller than that of the main oscillation circuit, and means for supplying electric energy to said auxiliary circuit, said two oscillation circuits being suitably connected to cause the high frequency energy produced in the auxiliary circuit to break the gap in said main oscillation circuit, said main oscillation circuit being coupled with a slightly damped secondary circuit.

GEORG von ARCO.
ALEXANDER MEISSNER.

Witnesses:
 WOLDEMAR HAUPT,
 HENRY HASPER.